(12) United States Patent
Narayanan et al.

(10) Patent No.: US 12,530,376 B2
(45) Date of Patent: Jan. 20, 2026

(54) COMPUTING ENVIRONMENT SCALING

(71) Applicant: Oracle International Corporation, Redwood Shores, CA (US)

(72) Inventors: Biju Narayanan, Trivandrum (IN); Milind Gurudassa Xete Chatim Aldoncar, Baina (IN); Hari Gopinathan Nair Indira Devi, Kumarapuram (IN); Deepankar Narayanan, Thiruvananthapuram (IN)

(73) Assignee: Oracle International Corporation, Redwood Shores, CA (US)

( * ) Notice: Subject to any disclaimer, the term of this patent is extended or adjusted under 35 U.S.C. 154(b) by 258 days.

(21) Appl. No.: 17/410,092

(22) Filed: Aug. 24, 2021

(65) Prior Publication Data

US 2023/0047781 A1 Feb. 16, 2023

Related U.S. Application Data

(60) Provisional application No. 63/233,028, filed on Aug. 13, 2021.

(51) Int. Cl.
*G06F 16/28* (2019.01)
(52) U.S. Cl.
CPC .................. *G06F 16/285* (2019.01)
(58) Field of Classification Search
CPC .................................................. G06F 16/285
See application file for complete search history.

(56) References Cited

U.S. PATENT DOCUMENTS

| | | | |
|---|---|---|---|
| 2012/0173709 A1 | 7/2012 | Li et al. | |
| 2015/0199224 A1* | 7/2015 | Mihnev | H04L 41/142 714/37 |
| 2016/0357589 A1 | 12/2016 | Singh et al. | |
| 2018/0248905 A1* | 8/2018 | Côté | G06N 3/08 |

(Continued)

OTHER PUBLICATIONS

"Apigee API Management Lifecycle," accessed at https://nl.devoteam.com/en/blog-post/apigee-api-management-lifecycle/, accessed on Jun. 2, 2021, pp. 5.

(Continued)

*Primary Examiner* — Van H Oberly
*Assistant Examiner* — Brooks T Hale
(74) *Attorney, Agent, or Firm* — Invoke

(57) ABSTRACT

A system uses a machine learning model to identify anomalies and modify parameters of a computing environment. The system modifies parameters of a computing environment based on the presence and absence of anomalies in the computing system while avoiding modifying parameters as a result of brief spikes in computing environment attributes. The system uses a machine learning model to generate predictions of anomalies for data points of computing environment attributes. The system compiles sets of predictions into batches. The system determines whether each batch includes enough anomalous-labeled data points to be considered an anomalous batch. The system compiles the batches into sets. The system determines whether the sets of batches include enough anomalous batches to be considered an anomalous set of batches. The system modifies the parameters of the computing environment based on determining whether or not the sets of batches are anomalous.

25 Claims, 4 Drawing Sheets

(56) References Cited

U.S. PATENT DOCUMENTS

| | | | | |
|---|---|---|---|---|
| 2019/0171494 | A1* | 6/2019 | Nucci | G06N 5/003 |
| 2020/0265119 | A1* | 8/2020 | Desai | G06K 9/6247 |
| 2022/0237102 | A1* | 7/2022 | Bugdayci | G06F 11/3495 |

OTHER PUBLICATIONS

"Serving Machine Learning Models Using Apigee and AI Platform," accessed at https://cloud.google.com/architecture/serving-machine-learning-models-using-apigee-edge-and-ml-engine, accessed on Jun. 2, 2021, pp. 3.

Anand, V., "Simplifying API operations with AI as you scale your API programs," accessed at https://cloud.google.com/blog/products/api-management/apigee-x-simplifies-api-management-with-ai, May 24, 2021, pp. 3.

Biswas, A., et al., "An Auto-scaling Framework for Controlling Enterprise Resources on Clouds," 15th IEEE/ACM International Symposium on Cluster, Cloud and Grid Computing, May 4-7, 2015, pp. 971-980.

Dutta, S., et al., "SmartScale: Automatic Application Scaling in Enterprise Clouds," IEEE Fifth International Conference on Cloud Computing, Jun. 24-29, 2012, pp. 221-228.

Kuzs, A, R., "Time-based scaling of Enterprise Search on Elastic Cloud," accessed at https://www.elastic.co/blog/time-based-scaling-of-enterprise-search-on-elastic-cloud, Apr. 1, 2021, pp. 4.

Laurendine, B., "Autoscale your Elastic Cloud data and machine learning nodes," accessed at https://www.elastic.co/blog/autoscale-your-elastic-cloud-data-and-machine-learning-nodes, Mar. 3, 2021, pp. 3.

Sammy, K.., "Google Cloud launches Apigee X to help enterprises scale up," accessed at https://www.techzine.eu/news/cloud/55473/google-cloud-launches-apigee-x-to-help-enterprises-scale-up/, Feb. 8, 2021, p. 1.

Srirama, S.N., et al., "Dynamic Deployment and Auto-scaling Enterprise Applications on the Heterogeneous Cloud," IEEE 9th International Conference on Cloud Computing (CLOUD), Jun. 2016, pp. 927-932.

Srirama, S.N., et al., "Optimal Resource Provisioning for Scaling Enterprise Applications on the Cloud," IEEE 6th International Conference on Cloud Computing Technology and Science, Dec. 15-18, 2014, pp. 262-271.

* cited by examiner

COMPUTING ENVIRONMENT SCALING

INCORPORATION BY REFERENCE; DISCLAIMER

This application is hereby incorporated by reference: application No. 63/233,028 filed on Aug. 13, 2021. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to using a machine learning model to identify anomalies and modify parameters of a computing environment. In particular, the present disclosure relates to modifying parameters of a computing environment based detecting anomalous attributes in the computing system. The system avoids modifying the computing environment parameters when a detected anomaly is a result of brief spikes in computing environment attributes.

BACKGROUND

Cloud computing enables multiple subscribers or tenants to utilize a pool of computing resources. Examples of cloud-based computing resources include servers, computing networks, and software applications. Utilizing cloud computing allows subscribers to rapidly adjust the resources used without the need to host additional physical resources on-site.

As a number of subscribers accessing the cloud changes, the load on the pool of cloud computing resources also changes. In addition, as the number and type of applications executed over the cloud change, the load on the pool of cloud computing resources changes. Organizations utilizing cloud services require consistent access to the cloud computing resources. A cloud service provider may scale up resources during periods of high demand. However, access to additional cloud resources results in increased cost to subscribers. In addition, scaling up available resources to meet the highest potential demand results in cloud resources being unused in periods of low demand.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
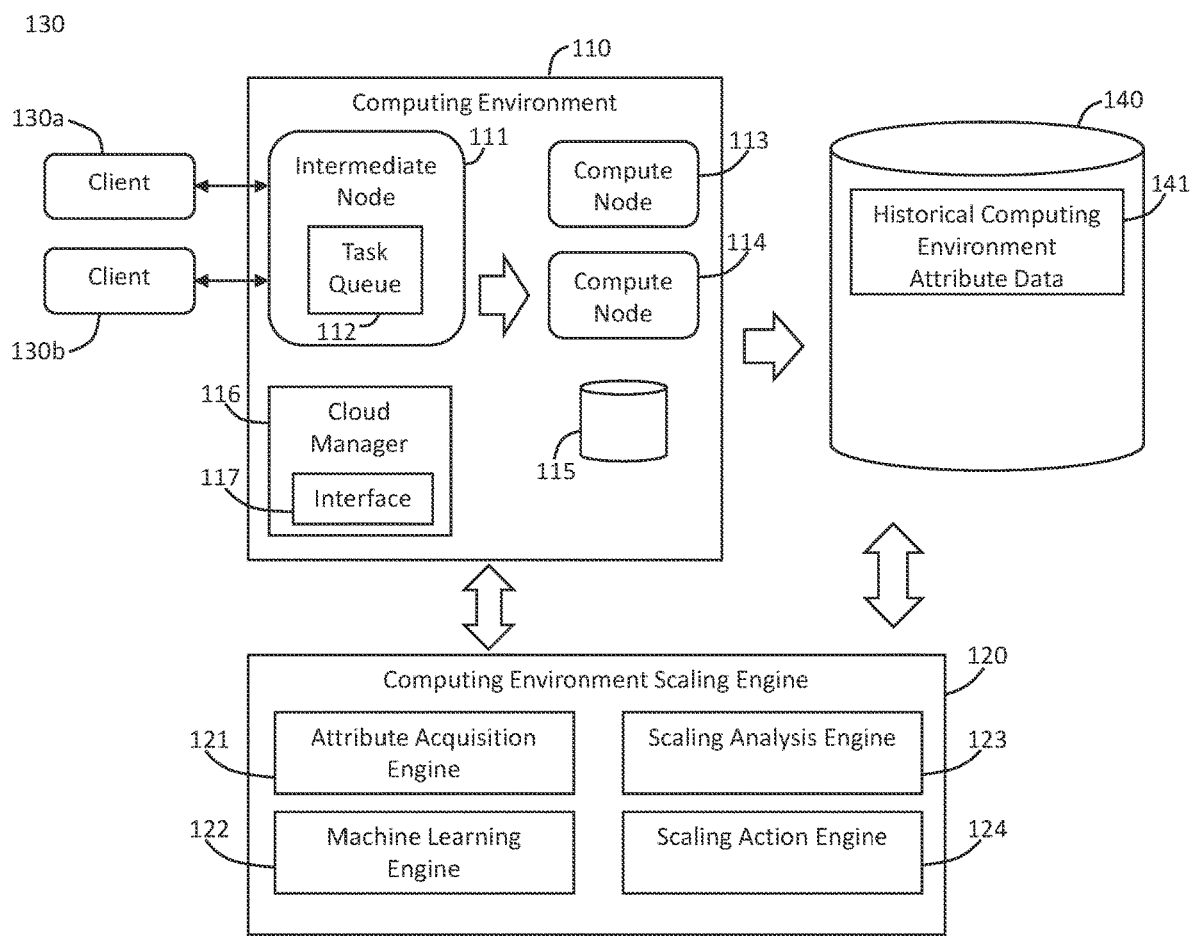
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. APPLYING A MACHINE LEARNING MODEL TO MODIFY COMPUTING ENVIRONMENT PARAMETERS
4. TRAINING A MACHINE LEARNING MODEL
5. COMPUTER NETWORKS AND CLOUD NETWORKS
6. MISCELLANEOUS; EXTENSIONS
7. HARDWARE OVERVIEW

1. General Overview

A system detects anomalies in a computing environment and modifies parameters of the computing environment according to the detected anomalies. The system takes into account temporary spikes in computing environment attributes to avoid frequent modification of the computing environment parameters.

One or more embodiments include monitoring operations of a computing environment to obtain attribute data for the computing environment. For example, the system may employ monitoring software or hard-coded monitoring functionality to monitor nodes in a cloud-computing environment. Examples of computing environment attributes include: memory utilized, total memory available, task queue size, current task queue status, applications currently running, servers available, central processing unit (CPU) load, bandwidth available, bandwidth utilized, virtual memory available, virtual memory utilized, sessions in use, and active garbage collections. The system trains a machine learning model using the computing environment attribute data to predict the presence of anomalies in the computing environment. Anomalies correspond to a performance degradation of the computing environment. For example, the machine learning model may learn that a particular combination of the current-task queue status, virtual memory available, and sessions-in-use indicates a present or future performance degradation of the computing environment. The anomaly prediction may correspond to an anomaly that is predicted to currently exist in the computing environment or an anomaly that is predicted to exist in the computing environment in the future.

The system groups together consecutively-generated data points and associated "anomalous"/"non-anomalous" predictions, into sets, or batches, of data points. Each batch corresponds to a different segment of time. The system calculates a number of "anomalous" data points in each batch, or data points corresponding to a prediction that an anomaly exists, or will exist, in the computing environment. If the number of "anomalous" data points in each batch meets a threshold number, the system labels the batch as "anomalous." The system analyzes a set of consecutively-generated batches. If the number of "anomalous" batches in the set meets a threshold, the system modifies parameters of the computing environment. For example, if the system identifies two batches in a set of three consecutively-generated batches as being "anomalous," the system may increase the computing resources available in the computing environment. Conversely, if the system identifies one batch in a set of three consecutively-generated batches as being "anomalous," the system may incrementally decrease computing resources in the system. In addition, or in the alternative, the system may generate a notification indicating a computing system in an anomalous or non-anomalous state. The system action—whether adding or removing computing resources or generating a notification—may be selected by a user. Examples of modifiable computing environment parameters include: a number of compute nodes or a specific type of compute node, a number of intermediate nodes, a number of database nodes, a size of an existing node, a division of a partition of an existing node, a processing capacity, a data storage capacity, a data transmission capacity, and an I/O capacity.

In one or more embodiments, the system performs one type of action when the system identifies a batch set as "anomalous." The system may perform a different type of action when the system identifies the batch set as "non-anomalous." For example, the system may up-scale computing environment parameters proportionally to a predicted system load. In subsequent periods of time, the system my incrementally down-scale the computing environment parameters independently of the magnitude of the predicted system load. For example, if the system adds three compute nodes to a cloud computing environment to execute tasks based on predicting an anomaly in the computing environment, the system may incrementally remove only one compute node after each period of time in which no "anomalous" sets of batches are detected. The system may add the three compute nodes at one time based determining that the predicted computing environment load would require three compute nodes to avoid a service degradation in the computing environment. In contrast, the system may be configured to remove only one compute node at a time from the computing environment regardless of whether the system determines one node or three nodes may be removed while still meeting a required system specification.

In one or more embodiments, a system trains a machine learning model to identify anomalies in the computing environment. The system monitors the computing environment to identify attributes of the computing environment. A machine learning engine generates a training data set including: (a) data points comprising a set of attributes of the computing environment, and (b) labels for each data point indicating whether the data point is anomalous. The machine learning engine trains a machine learning model using the training data set to predict anomalies in the computing environment. In one embodiment, a machine learning engine further generates a recommended modification to one or more computing environment parameters. The system applies the trained machine learning model to target data points associated with attributes of the computing environment to predict whether the target data points are anomalous.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a computing environment 110, a computing environment scaling engine 120, clients 130, and a data repository 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

The computing environment 110 includes nodes accessible by clients 130a and 130b. Examples of nodes include servers, partitions within a server, or a group of networked computers, for example. In the embodiment illustrated in FIG. 1, the computing environment 110 includes an intermediate node 111, compute nodes 113 and 114, a database 115, and a cloud manager 116. The intermediate node 111 is a load-balancing router that receives data transmission requests, queues the requests in a task queue 112, and routes the requests to a corresponding compute node 113 or 114. The computer nodes 113 and 114 may include, for example, Elasticsearch servers, web servers, process scheduler servers, and application servers. For example, a client 130a may access a virtual machine hosted by the compute node 113. The virtual machine may provide the client 130a with an interactive graphical user interface (GUI) and applications executed on the compute node 113. As the client 130a interacts with the GUI to generate data transfer requests, the intermediate node 111 queues the instructions and routes them to the compute node 113. The compute node 113 executes the instructions and may return information to the client 130a. For example, the compute node 113 may access data stored in the database 115, operate on the data, and return a result to the client 130a. In another example, the client 130a may store an application accessible by multiple clients 130a and 130b. As the clients 130a and 130b generate requests to access the application, the intermediate node 111 queues the requests based on processing and load parameters, such as available processors or threads, available bandwidth, available memory, priority of requests, etc.

A cloud manager 116 manages the nodes in the computing environment 110. The cloud manager 116 may monitor and control a number of nodes and an operation of the nodes in the computing environment. The cloud manager 116 may increase a number of nodes in the computing environment 110 by assigning additional physical resources, such as servers and data repositories, to the computing environment 110. In one embodiment, a user interacts with an interface 117 to set a scaling policy for the computing environment 110. The scaling policy may specify when and how to increase or decrease nodes, computing resources, and other parameters of the computing environment 110 based on triggering conditions. Examples of triggering conditions include detecting or predicting a particular usage characteristic, data storage characteristic, or data transmission characteristic of the computing environment 110.

A computing environment scaling engine 120 analyzes computing environment data generates instructions or recommendations to up-scale/down-scale/maintain-constant parameters of the computing environment 110. Examples of modifiable computing environment parameters include: a number of compute nodes or a specific type of compute node, a number of intermediate nodes, a number of database nodes, a size of an existing node, a division of a partition of an existing node, a processing capacity, a data storage capacity, a data transmission capacity, and an I/O capacity.

The computing environment scaling engine 120 includes an attribute acquisition engine 121. The attribute acquisition engine 121 obtains computing environment attribute information from the computing environment 110. Examples of computing environment attributes include: memory utilized, total memory available, task queue size, current task queue status, applications currently running, servers available, central processing unit (CPU) load, bandwidth available, bandwidth utilized, virtual memory available, virtual memory utilized, sessions in use, and active garbage collections. In one embodiment, the cloud manager 116 manages a monitoring program that collects the computing environment attribute information and transmits the information to the computing environment scaling engine 120. In addition, or in the alternative, the cloud manager 116 may direct the gathered attribute information to the data repository 140 to be stored with historical computing environment attribute data 141.

The computing environment scaling engine 120 includes a machine learning engine 122. The machine learning engine 122 trains a machine learning model using the obtained computing environment attribute data to predict anomalies in the computing environment 110. Anomalies correspond to a performance degradation of the computing environment 110. For example, the machine learning model may learn that a particular combination of computing environment attributes including the current task queue status, virtual memory available, and sessions in use indicates performance degradation of the computing environment 110. The machine learning engine 122 trains the machine learning model to predict one or both of presently-existing anomalies and anomalies that are predicted to exist in the future based on the current computing environment attribute values. Examples of anomalies include: (a) inability to deliver services, such as application services, data retrieval, data display, and data transmission, according to pre-defined specifications, (b) inability to process client requests, (b) inability to process client requests within a specified time frame, (d) a node or system crash, and (e) inability to perform background cloud operations, such as garbage collection and data back-up.

A scaling analysis engine 123 analyzes and organizes the predictions from the machine learning engine to generate "anomalous"/"non-anomalous" labels for predetermined periods of time. The predetermined periods of time are represented by a defined number of predictions associated with a corresponding number of data points comprising computing environment attributes. The scaling analysis engine 123 generates sets, or batches, of consecutively-generated predictions. The scaling analysis engine 123 determines whether a number of predictions in each batch that predict an anomaly in the computing environment 110 meets a threshold number. The scaling analysis engine 123 labels the batch as "anomalous" or "non-anomalous" accordingly. The scaling analysis engine 123 further analyzes a set of consecutively-generated batches. The scaling analysis engine 123 determines whether a number of batches identified as anomalous in each set of consecutively-generated batches meets a threshold number.

A scaling action engine 124 receives a data output from the scaling analysis engine 123 indicating whether the number of batches identified as anomalous in each set of consecutively-generated batches meets the threshold number. The scaling action engine 124 generates an instruction or recommendation to perform a scaling action based on the data received from the scaling analysis engine 123. Examples of scaling actions include: generating a notification of an anomaly prediction and displaying a recommendation to up-scale a computing environment parameter, generating an instruction to up-scale a computing environment parameter, generating a notification that no anomaly has been detected for a predetermined period of time and recommending down-scaling a computing environment parameter, generating an instruction to down-scale a computing environment parameter. In one embodiment, the scaling action engine 124 transmits the scaling action instruction to the cloud manager 116 to perform the scaling action. For example, the cloud manager 116 may modify a computing environment parameter or generate a notification via the interface 117 based on the scaling action instruction.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the computing environment 110. Alternatively, or additionally, a data repository 140 may be implemented or executed on a computing system separate from the computing environment 110. A data repository 140 may be communicatively coupled to the computing environment 110 via a direct connection or via a network.

Information describing historical computing environment attribute data 141 may be implemented across any of components within the system 100. However, this information is illustrated within the data repository 140 for purposes of clarity and explanation.

In one or more embodiments, a computing environment scaling engine 120 refers to hardware and/or software configured to perform operations described herein for modifying parameters of a computing environment while taking into account attribute spikes. Examples of operations for analyzing computing environment attributes and modifying parameters of the computing environment are described below with reference to FIG. 2.

In an embodiment, the computing environment 110 and the computing environment scaling engine 120 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 117 refers to hardware and/or software configured to facilitate communications between a user and the cloud manager 116. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

In one or more embodiments, a tenant (such as client 130a and/or client 130b) is a corporation, organization, enterprise, or other entity that accesses a shared computing resource, such as an application stored and executed in the computing node 113. In an embodiment, tenants are independent from each other. For example, a business or operation of client 130a is separate from a business or operation of client 130b.

3. Applying a Machine Learning Model to Modify Computing Environment Parameters

Figure 2:
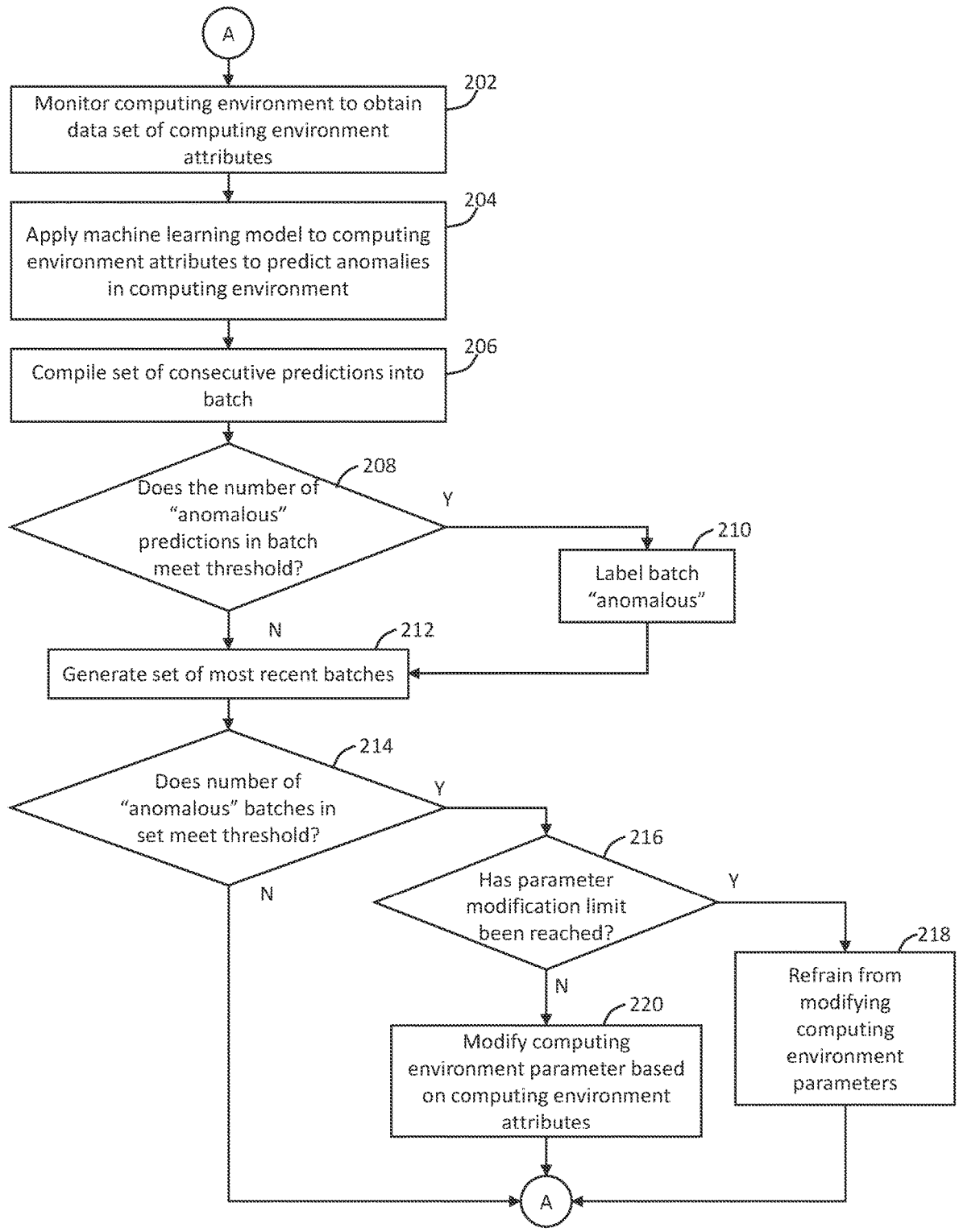
FIG. 2 illustrates an example set of operations for modifying computing environment parameters while isolating parameter spikes in accordance with one or more embodiments.

FIG. 2 illustrates an example set of operations for applying a machine learning model to a computing environment to identify anomalies and modify computing environment parameters in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system monitors a computing environment to obtain a data set including computing environment attributes (Operation 202). The computing environment may be a distributed computing environment or networked computing environment. In one embodiment, the computing environment is a cloud computing environment in which one or more nodes storing and executing one or more applications are accessible by client devices via a network. In one embodiment, the computing environment includes an application or program that monitors physical devices in the computing environment and stores attribute data. Examples of stored attribute data include: memory utilized, total memory available, task queue size, current task queue status, applications currently running, servers available, central processing unit (CPU) load, bandwidth available, bandwidth utilized, virtual memory available, virtual memory utilized, sessions in use, and active garbage collections.

The system applies a machine learning model to the attribute data to predict anomalies in the computing environment (Operation 204). For example, one data point may include computing environment attributes spanning on duration of time, such as one minute. The system applies the machine learning model to the data point and generates a label—"anomaly" or "no anomaly"—for the data point. An "anomaly" prediction indicates a predicted performance degradation in the computing environment. For example, the machine learning model may learn that a particular combination of the current task queue status, virtual memory available, and sessions in use result in an inability of the system to respond to client queries within a specified period of time. The system may generate a prediction for the data point having the particular combination of attributes as: "anomaly." An anomaly prediction may correspond to a presently-existing anomaly based on the computing environment attributes. Alternatively, the anomaly prediction may correspond to a predicted future status of the computing environment. For example, the system may be able to presently respond to client queries according to a pre-defined specification. However, the machine learning model may predict an anomaly in the system. The prediction may indicate that the system will soon be unable to respond to the client queries according to the pre-defined specification.

The system compiles a set of consecutively-generated predictions into a batch (Operation 206). For example, the system may be configured to generate one prediction every six minutes. A batch may comprise ten predictions generated in a particular hour. The system may continuously generate a new batch, including ten new predictions, every hour.

The system determines whether a number of "anomalous" predictions in a batch meets a predetermined threshold (Operation 208). For example, if a batch includes ten predictions, a threshold may be set at six. The threshold may be configurable by a user.

If the number of "anomalous" predictions in the batch meets the threshold, the system labels the batch as "anomalous" (Operation 210). Otherwise, the system does not label the batch as "anomalous." Adjustment of the threshold by a user allows the user to adjust a sensitivity of the system to "anomaly" predictions. For example, a threshold of three out of ten predictions results in a batch being labeled "anomalous" when only three predictions in the batch are labeled "anomalous." A threshold of seven out of ten predictions results in a batch being labeled "anomalous" when no fewer than seven predictions in the batch are labeled "anomalous." In embodiments, the "anomalous" predictions need not be consecutive predictions within a particular batch. Instead, the predictions within the batch that are identified as "anomalous" may be at any position within the batch. For example, a batch may include three "anomalous" predictions: a first chronologically-generated prediction, a third chronologically-generated prediction, and the last chronologically-generated prediction. A batch may be labeled "anomalous" when the pre-defined number of predictions within the batch is identified as "anomalous," regardless of the position of the predictions within the batch.

The system generates a set of a pre-defined number of the most recently-generated batches (Operation 212). For example, the system may generate a set of the three most recently-generated batches. The set of batches may be a rolling set of batches. For example, if the set of batches includes the three most recently-generated batches, when a new batch is generated, it is added to the set and the oldest batch is removed from the set. When the next batch is generated, the process is repeated, with the newest batch replacing the oldest batch in the set of batches.

The system determines whether the number of "anomalous" batches in the set of batches meets a threshold (Operation 214). For example, the set of batches may include the three most recently-generated batches. The threshold may be set at "two." The system may determine whether two or more of the three batches is labeled "anomalous." In one embodiment, the threshold is a parameter-upscaling threshold. The system determines whether to upscale computing environment parameters based on the threshold being met. In another embodiment, the threshold is a parameter-downscaling threshold. The system determines whether to downscale the computing environment parameters based on the threshold being met. For example, in the embodiment in which the threshold is the parameter-upscaling threshold, the threshold number of batches for a set of three batches may be two batches. If two batches are identified as anomalous, the system proceeds to a parameter-upscaling operation. In the embodiment in which the threshold is the parameter-downscaling threshold, the threshold number of batches for the set of three batches may be one batch. If one or zero batches are anomalous, the system proceeds to a parameter-downscaling operation.

If the system determines that the number of "anomalous" batches meets the threshold, the system determines whether a parameter modification limit has been reached (Operation 216). For example, the system may be configured to up-scale the number of nodes in the computing environment when the number of "anomalous" batches meets the parameter-upscaling threshold. In such an example, the system determines whether the number of nodes in the computing environment is at a maximum number of nodes. The maximum number of nodes may be set by a user. For example, the system may be set to have a baseline number of four nodes in a computing environment with a parameter up-scaling limit of two additional nodes. According to another example, the system may be configured to up-scale the computing environment by adding additional processing capacity—such as CPUs, threads, and processors—to the computing environment. The system determines whether the current processing capacity is at a maximum-allowed processing capacity.

In another embodiment, the system may be configured to down-scale the number of nodes in the computing environment when the number of "anomalous" batches meets a parameter-downscaling threshold. The system determines whether the number of nodes in the computing environment is at a baseline number of nodes. For example, the system may be set to have a baseline number of four nodes in a computing environment with a parameter up-scaling limit of two additional nodes. The system determines that the parameter modification limit has been reached for down-scaling the number of nodes if the computing environment has only four nodes. Alternatively, the system determines that the parameter modification limit has not been reached for down-scaling if the number of nodes in the computing environment is five or more. In an alternative example, the system may be configured to down-scale the computing environment by reducing processing capacity—such as CPUs, threads, and processors—in the computing environment. The system determines whether the current processing capacity is at a baseline (not up-scaled) processing capacity.

If the system determines that the parameter modification limit has been met, the system refrains from further modifying computing environment parameters (Operation 218). For example, if the system determines that: (a) the number of anomalous batches in the set of batches meets a parameter-upscaling threshold, and (b) the parameter modification limit has been met, then the system refrains from further up-scaling the computing environment parameters. Conversely, if the system determines that: (a) the number of anomalous batches in the set of batches meets a parameter-downscaling threshold, and (b) the parameter modification limit has been met, then the system refrains from further down-scaling the computing environment parameters.

If the system determines that the parameter modification limit has not been met, the system modifies one or more computing environment parameters based on the computing environment attributes (Operation 220). In one embodiment, the parameter modification limit is a parameter upscaling limit. If the system determines that: (a) the number of anomalous batches in the set of batches meets a parameter-upscaling threshold, and (b) the parameter modification limit has not been met, then the system up-scales one or more computing environment parameters. In another embodiment, the parameter modification limit is a parameter downscaling limit. If the system determines that: (a) the number of anomalous batches in the set of batches meets a parameter-downscaling threshold, and (b) the parameter modification limit has not been met, then the system down-scales one or more computing environment parameters.

In one embodiment, the system modifies one or more system parameters in proportion to a predicted state of the system. For example, in an embodiment in which the parameter modification limit is a parameter upscaling limit and the system determines that a predicted anomaly would require the addition of two nodes in the computing environment to meet a specified response time, the system may up-scale the computing environment by adding two nodes at the same time. In another example in which the parameter modification limit is a parameter downscaling limit and the system determines that a predicted computing environment attributes would allow for the removal of two nodes while still meeting a specified response time, the system may down-scale the computing environment by removing two nodes at the same time.

In an alternative embodiment, the system modifies one or more system parameters incrementally, regardless of a magnitude of a predicted anomaly. For example, in an embodiment in which the parameter modification limit is a parameter upscaling limit and the system determines that a predicted anomaly would require the addition of two nodes in the computing environment to meet a specified response time, the system may up-scale the computing environment by adding only one node to the computing environment. The system may add a second node to the computing environment if a number of anomalous batches in a next set of batches meets the parameter-upscaling threshold. In another example in which the parameter modification limit is a parameter downscaling limit and the system determines that a predicted computing environment attributes would allow for the removal of two nodes while still meeting a specified response time, the system may down-scale the computing environment by removing only one node. The system may remove a second node from the computing environment if a number of anomalous batches in a next set of batches meets the parameter-downscaling threshold.

In yet another embodiment, the system may incrementally modify one or more computing environment parameters based on determining that a predetermined period of time has elapsed. In the example in which the parameter modification limit is a parameter downscaling limit and the system determines that a predicted computing environment attributes would allow for the removal of two nodes while still meeting a specified response time, the system may down-scale the computing environment by removing only one node. The system may remove a second node from the computing environment based on determining that: (a) a predetermined period of time has elapsed, and (b) a number of batches labeled "anomalous" in the predetermined period of time meets a parameter-downscaling threshold. For example, the system may downscale one or more computing environment parameters based on determining that no batches in a ten-minute period of time have been labeled "anomalous."

In one embodiment, the system may up-scale one or more computing environment parameters in proportion to a magnitude of a predicted anomaly and down-scale the one or more computing environment parameters incrementally. For example, a machine learning model may predict an anomaly requiring the addition of one node, one unit of additional computing capacity (such as an additional CPU), and one unit of additional memory (such as an additional amount of data storage) to meet a specified response-time requirement. Based on: (a) the magnitude of the predicted anomaly, and (b) determining that the number of anomalous batches in a set of batches meets an up-scaling threshold, the system may up-scale the computing environment with an additional node, a unit of additional computing capacity, and additional memory. Subsequently, based on: (a) determining that the number of anomalous batches in a subsequent set of batches meets a down-scaling threshold, and (b) a predetermined amount of time has passed, the system may incrementally down-scale the one or more parameters by removing the additional computing capacity from the computing environment. After a subsequent increment of time, the system may remove the additional node. After a further-subsequent increment of time, the system may remove the additional memory from the computing environment.

In one embodiment, the system determines which computing environment parameters to up-scale or down-scale based on the measured computing environment attributes. For example, the system may modify a processing capacity of a computing environment based on predicting a backlog of processing requests. The system may assign additional communication ports to a computing environment based on identifying a backlog of externally-generated requests. The system may assign additional memory capacity to a computing environment based on identifying a number of data storage or data access requests exceeding a capacity of the computing environment.

In one embodiment, a machine learning model generates recommendations for modifying one or more computing environment parameters. In a computing environment in which hundreds of attributes are monitored simultaneously, a source of an anomaly may not be immediately apparent. For example, a system may determine that the CPU usage in the computing environment is below a level that would trigger up-scaling of the computing capacity of the computing environment. However, a load balancer, that distributes tasks to the CPUs in the computing environment, may have a full queue and may be rejecting client requests. Thus, while analysis of the computing capacity, alone, may not identify an anomaly, a machine learning model may analyze hundreds of computing environment attributes, including a number and frequency of incoming requests, a status of a task queue, an I/O capacity, and a bandwidth of the computing environment to predict an anomaly. In addition, while a system may detect one or more anomalies after service degradation has occurred, the machine learning model may learn relationships between computing environment attributes and anomalies to predict a future anomaly in the computing environment. The system may modify computing environment parameters prior to an occurrence of an anomaly to prevent service degradation before it occurs.

In one embodiment, the machine learning model is trained to identify relationships between (a) tens or hundreds of monitored computing environment attributes and (b) a set of modifiable computing environment parameters. For example, the machine learning model may identify relationships among computing environment attributes including: memory utilized, total memory available, task queue size, current task queue status, applications currently running, servers available, central processing unit (CPU) load, bandwidth available, bandwidth utilized, virtual memory available, virtual memory utilized, sessions in use, and active garbage collections. The machine learning model may further identify the relationships between (a) combinations of the computing environment attributes and (b) modifiable computing environment parameters including: a number of compute nodes or a specific type of compute node, a number of intermediate nodes, a number of database nodes, a size of an existing node, a division of a partition of an existing node, a processing capacity, a data storage capacity, a data transmission capacity, and an I/O capacity.

In one embodiment, the machine learning model generates a recommendation for up-scaling or down-scaling one or more computing environment parameters together with the prediction of an "anomalous" or "non-anomalous" data point. For example, the machine learning model may predict a load on a particular application hosted in the computing environment would require the addition of two nodes to meet a specified response time. The machine learning model may generate the "anomalous" prediction together with the recommendation to add two additional nodes. Up-scaling the computing environment parameter may include modifying the computing environment parameters based on the machine learning model recommendation. In one embodiment, the system may up-scale the computing environment parameters in proportion to a predicted magnitude of an anomaly. For example, if the system determines that a predicted anomaly would require the addition of two nodes in the computing environment to meet a specified response time, the system may up-scale the computing environment by adding two nodes at the same time. Alternatively, the system may up-scale the computing environment incrementally, regardless of the predicted magnitude of the anomaly. For example, if the system determines that a predicted anomaly would require the addition of two nodes in the computing environment to meet a specified response time, the system may up-scale the computing environment by adding only one node after a determination that the number of "anomalous" batches in the set of batches meets the threshold. The system may add a second node if the system determines that number of "anomalous" batches in the next set of batches also meets the threshold.

In an alternative example, the machine learning model may predict a load on a particular application hosted in the computing environment will be sufficiently low that two nodes may be removed from the computing environment while still meeting a specified response time. The machine learning model may generate the "non-anomalous" prediction together with the recommendation to remove two nodes from the computing environment. Down-scaling the computing environment parameter may include modifying the computing environment parameters based on the machine learning model recommendation. In one embodiment, the system may down-scale the computing environment parameters in proportion to a predicted operating state of the computing environment. For example, if the system determines that a predicted operating state would allow for removing two nodes while still meeting a specified response time, the system may down-scale the computing environment by removing two nodes at the same time. Alternatively, the system may down-scale the computing environment incrementally, regardless of the predicted operating state of the computing environment. For example, if the system determines that a predicted operating state would allow for removing two nodes while still meeting a specified response time, the system may down-scale the computing environment by removing only one node after a determination that the number of "anomalous" batches in the set of batches meets the threshold. The system may remove a second node if the system determines that number of "anomalous" batches in the next set of batches also meets the threshold.

In one or more embodiments, modifying a computing environment parameter includes generating a notification that includes a recommendation for modifying a computing environment parameter. A user may interact with the notification to up-scale or down-scale one or more computing environment parameters.

According to one or more embodiments, the system avoids modifying computing environment parameters in response to spikes in computing environment attributes by: (a) generating batches of predictions of anomalous/non-anomalous data points, (b) generating sets of batches, and (c) modifying the computing environment parameters based on the sets of batches, instead of based on individual predictions.

4. Training a Machine Learning Model

Figure 3:
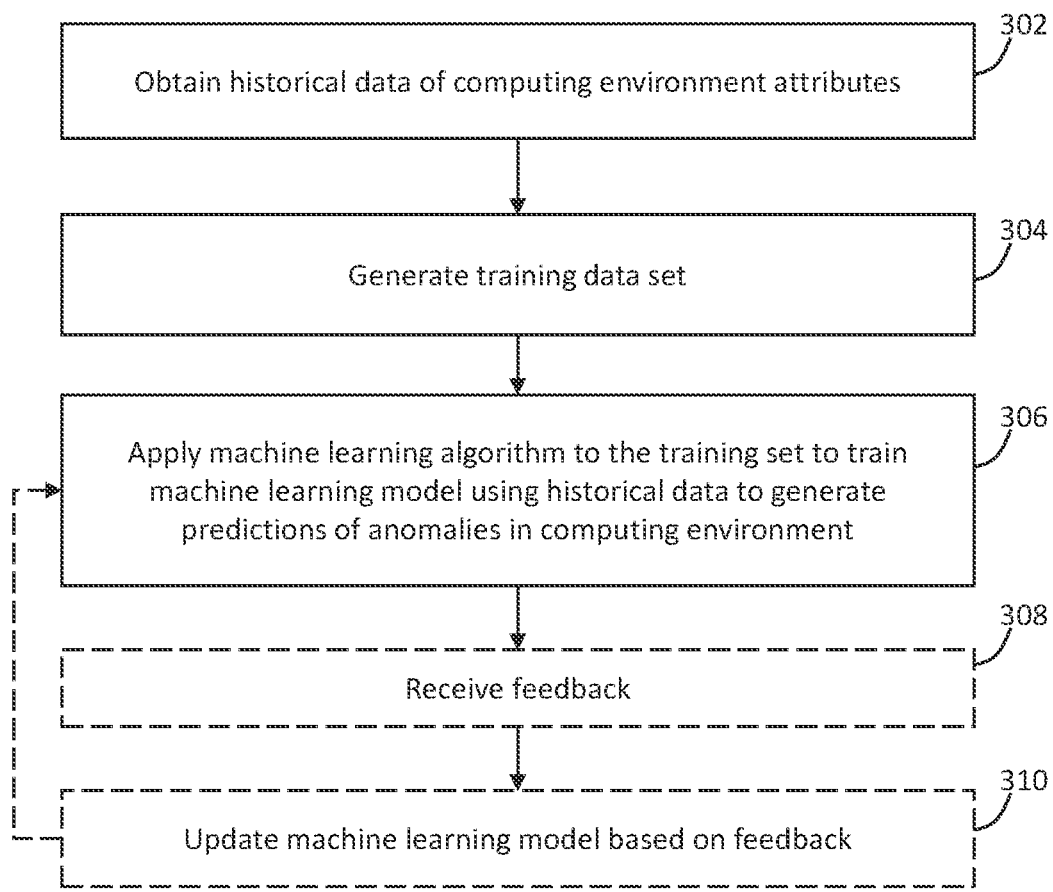
FIG. 3 illustrates an example set of operations for training a machine learning model in accordance with one or more embodiments.

FIG. 3 illustrates an example set of operations for training a machine learning model in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system obtains historical data associated with historical computing environment attributes (Operation 302). The historical computing environment attributes include, for example: memory utilized, total memory available, task queue size, current task queue status, applications currently running, servers available, central processing unit (CPU) load, bandwidth available, bandwidth utilized, virtual memory available, virtual memory utilized, sessions in use, and active garbage collections.

The system generates a training data set using the historical data (Operation 304). The training data set includes data points comprising computing environment attributes for a particular segment of time and a label—"anomalous" or "non-anomalous"—associated with the data points.

The system applies a machine learning algorithm to the training set to train a machine learning model to predict whether particular data points correspond to anomalies or not in the computing environment (Operation 306). Examples of anomalies include: (a) inability to deliver services, such as application services, data retrieval, data display, and data transmission, according to pre-defined specifications, (b) inability to process client requests, (b) inability to process client requests within a specified time frame, (d) a node or system crash, and (e) inability to perform background cloud operations, such as garbage collection and data back-up.

In one embodiment, the machine learning model is trained to identify particular computing environment attributes that are most likely to contribute to an anomaly. For example, each data point may comprise hundreds of computing environment attributes. The machine learning model may identify between ten and twenty of the hundreds of computing environment attributes that have the highest likelihood of corresponding to an anomaly.

In one embodiment, the training data set further includes modifiable parameters of the computing environment. Examples of modifiable parameters include: a number of compute nodes or a specific type of compute node, a number of intermediate nodes, a number of database nodes, a size of an existing node, a division of a partition of an existing node, a processing capacity, a data storage capacity, a data transmission capacity, and an I/O capacity. The machine learning model may be trained to identify relationships between the computing environment attributes, the computing environment parameters, and the presence of anomalies in the computing environment. Accordingly, the machine learning model may be trained to identify one or more computing environment parameters to be modified based on predicting an anomaly.

The system receives user feedback based on the anomaly prediction and the recommendations for modifying computing environment parameters (Operation 308). For example, the feedback may indicate that particular prediction of "anomalous" or "non-anomalous" should be changed. Alternatively, the feedback may provide an alteration to a recommendation from the machine learning model for modifying a computing environment parameter. For example, the machine learning model may recommend adding two nodes to a computing environment, and the feedback may indicate the addition of only one node.

The system updates the machine learning model based on the feedback (Operation 310). For example, if a user indicates that a particular set of computing environment attributes should be associated with an "anomalous" prediction for a particular data point, the system re-trains the machine learning model by adjusting parameters of the model such that the particular computing environment attributes will result in an "anomalous" prediction for the data point.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
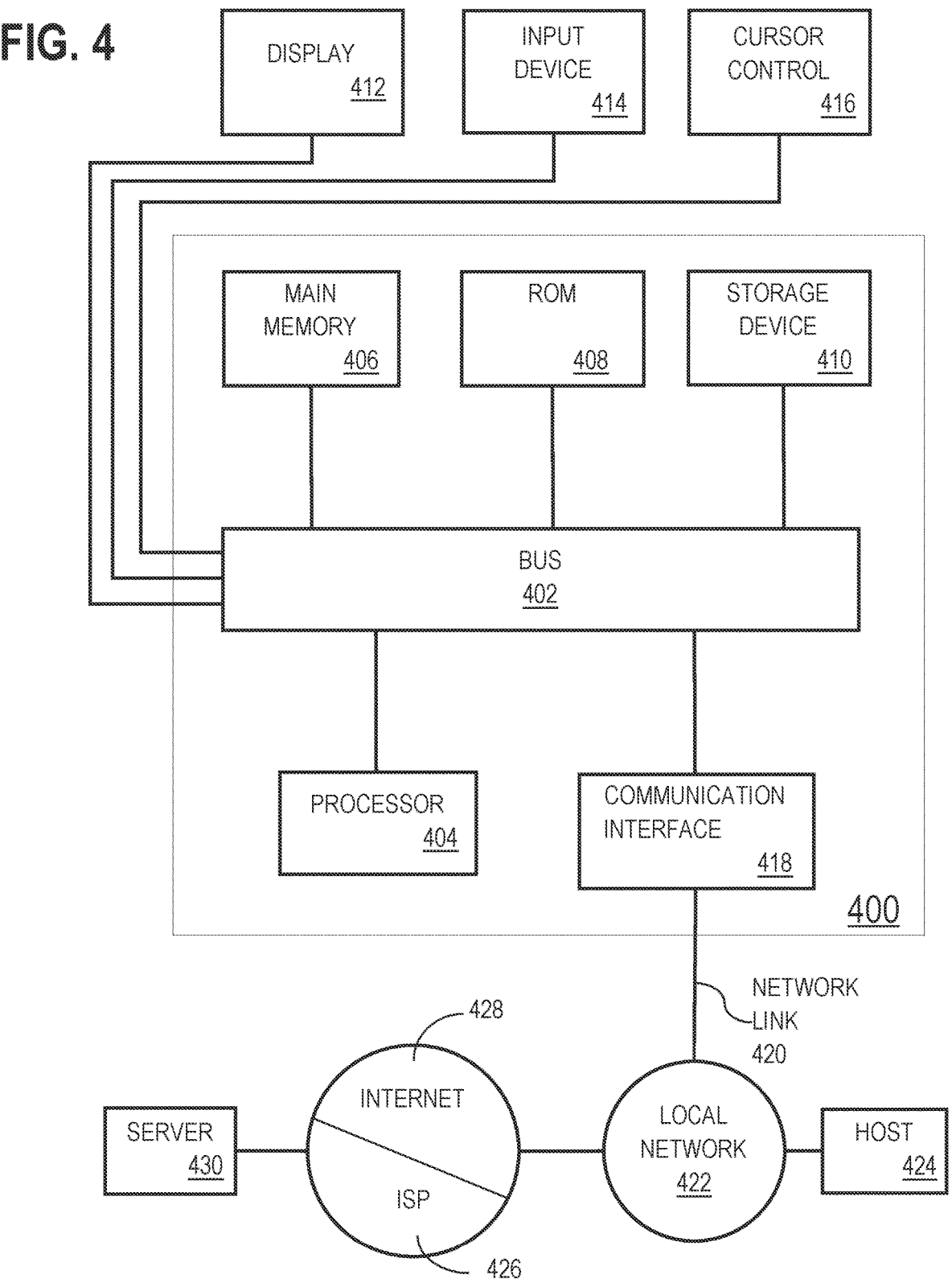
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   monitoring a computing environment to obtain a data set, wherein the data set comprises a plurality of data points, each data point comprising a plurality of attributes of the computing environment, wherein the computing environment is configured with a first configuration of parameters for storing and processing data in the computing environment;
   applying a machine learning model to a data point among the plurality of data points to generate a prediction whether the data point corresponds to an anomaly in the computing environment;
   grouping sets of consecutively-generated data points into a plurality of batches, each batch corresponding to a different segment of time;
   for each particular batch of the plurality of batches:
      classifying the particular batch as anomalous or non-anomalous based on a number of data points in the particular batch that are predicted to be anomalous by the machine learning model;
   analyzing a first set of consecutively-occurring batches from among the plurality of batches; and
   based on determining that a number of batches identified as anomalous, from among the first set of consecutively-occurring batches, meets a second threshold number: modifying the first configuration of computing resources in the computing environment to configure the computing environment with a second configuration of computing resources at least by:
   up-scaling or down-scaling the computing resources based on a predicted anomaly in the computing environment,
   wherein up-scaling or down-scaling the computing resources based on the predicted anomaly includes at least one of: modifying a number of computing resources available to execute tasks in the computing environment, modifying a storage capacity of the computing resources, and modifying a data transmission capacity of the computing resources.

2. The medium of claim 1, wherein the operations further comprise:
   obtaining historical data associated with historical computing environment attributes;
   generate a training data set from the historical data, the training data set comprising:
      historical data points comprising historical attribute data for the plurality of attributes of the computing environment, and
      for each historical data point, a label indicating whether the historical data point is associated with the anomaly in the computing environment; and
   training the machine learning model using the training data set to generate, for a particular data point of attribute data of the computing environment, a prediction whether the particular data point corresponds to an anomaly in the computing environment.

3. The medium of claim 2, wherein the training data set further comprises:
   historical computing environment parameter data,
   wherein the machine learning model is further trained using the trained data set to generate, for the particular data point of attribute data of the computing environment, a recommendation for modifying one or more computing environment parameters associated with the
anomaly in the computing environment.

4. The medium of claim 1, wherein the second threshold number is a parameter-upscaling threshold number,
wherein modifying the first configuration of the computing resources in the computing environment comprises:
up-scaling the computing resources proportional to a magnitude of a predicted anomaly in the computing environment.

5. The medium of claim 4, wherein the operations further comprise:
subsequent to up-scaling the computing resources in the computing environment:
detecting a predetermined period of time has elapsed;
during the predetermined period of time, analyzing a second set of consecutively-occurring batches from among the plurality of batches; and
based on determining that a number of batches identified as anomalous, from among the second set of consecutively-occurring batches, meets a parameter-downscaling threshold number: downscaling the computing resources in the computing environment.

6. The medium of claim 1, wherein the second threshold number is a computing-resource-downscaling threshold number,
wherein modifying the first configuration of computing resources in the computing environment comprises:
down-scaling the computing resources in the computing environment.

7. The medium of claim 1, wherein the operations further comprise:
receiving user input selecting one action to perform based on determining that the number of batches identified as anomalous, from among the first set of consecutively-occurring batches, meets the second threshold number, the one action selected from among: (a) automatically modifying the first configuration of the computing resources in the computing environment, and (b) generating a notification indicating that the number of batches identified as anomalous, from among the first set of consecutively-occurring batches, meets the second threshold number.

8. The medium of claim 1, wherein determining that the number of batches identified as anomalous, from among the first set of consecutively-occurring batches, meets the second threshold number includes labeling the first set of consecutively-occurring batches as anomalous, and
wherein modifying the first configuration of the computing resources in the computing environment is based on determining the first set of consecutively-occurring batches is labeled as anomalous.

9. The medium of claim 1, wherein the computing environment is a cloud-based computing environment including a plurality of compute nodes and at least one intermediate node, the at least one intermediate node comprising a task queue for directing computing tasks to the plurality of compute nodes,
wherein the plurality of attributes of the computing environment includes a first set of attributes of the plurality of compute nodes and a second set of attributes of the at least one intermediate node,
wherein modifying the first configuration of the computing resources in the computing environment includes increasing a number of compute nodes available to the intermediate node in the computing environment for executing the computing tasks.

10. The non-transitory computer readable medium of claim 1, wherein the sets of consecutively-generated data points grouped into the plurality of batches comprise data points for which the machine learning model has generated a respective prediction whether the respective data point corresponds to an anomaly in the computing environment.

11. The non-transitory computer readable medium of claim 1, wherein up-scaling or down-scaling the computing resources comprises up-scaling or down-scaling at least one of:
a number of compute nodes in the computing environment;
a specific type of compute node in the computing environment;
a number of intermediate nodes in the computing environment;
a number of database nodes in the computing environment;
a size of an existing node in the computing environment;
a division of a partition of the existing node in the computing environment;
a processing capacity available in the computing environment;
a data storage capacity available in the computing environment;
a data transmission capacity available in the computing environment; and
an input/output (I/O) capacity available in the computing environment.

12. The non-transitory computer readable medium of claim 1, wherein monitoring the computing environment to obtain the data set comprises monitoring a set of compute nodes configured to execute computing tasks in the computing environment to determine values for a usage metric for the set of compute nodes,
wherein up-scaling or down-scaling the computing resources comprises at least one of:
adding a compute node to the set of compute nodes in the computing environment; and
increasing a number of processors available to the set of compute nodes for executing the computing tasks.

13. The non-transitory computer readable medium of claim 1, the up-scaling or down-scaling the computing resources is based on a magnitude of the predicted anomaly in the computing environment.

14. A method comprising:
monitoring a computing environment to obtain a data set, wherein the data set comprises a plurality of data points, each data point comprising a plurality of attributes of the computing environment, wherein the computing environment is configured with a first configuration of parameters for storing and processing data in the computing environment;
applying a machine learning model to a data point among the plurality of data points to generate a prediction whether the data point corresponds to an anomaly in the computing environment;
grouping sets of consecutively-generated data points into a plurality of batches, each batch corresponding to a different segment of time;
for each particular batch of the plurality of batches:
classifying the particular batch as anomalous or non-anomalous based on a number of data points in the particular batch that are predicted to be anomalous by the machine learning model;
analyzing a first set of consecutively-occurring batches from among the plurality of batches; and based on determining that a number of batches identified as anomalous, from among the first set of consecutively-occurring batches, meets a second threshold number: modifying the first configuration of computing resources in the computing environment to configure the computing environment with a second configuration of computing resources at least by:
up-scaling or down-scaling the computing resources based on a predicted anomaly in the computing environment,
wherein up-scaling or down-scaling the computing resources based on the predicted anomaly includes at least one of: modifying a number of computing resources available to execute tasks in the computing environment, modifying a storage capacity of the computing resources, and modifying a data transmission capacity of the computing resources.

15. The method of claim 14, further comprising:
obtaining historical data associated with historical computing environment attributes;
generate a training data set from the historical data, the training data set comprising:
historical data points comprising historical attribute data for the plurality of attributes of the computing environment, and
for each historical data point, a label indicating whether the historical data point is associated with the anomaly in the computing environment; and
training the machine learning model using the training data set to generate, for a particular data point of attribute data of the computing environment, a prediction whether the particular data point corresponds to an anomaly in the computing environment.

16. The method of claim 15, wherein the training data set further comprises:
historical computing environment parameter data,
wherein the machine learning model is further trained using the trained data set to generate, for the particular data point of attribute data of the computing environment, a recommendation for modifying one or more computing environment parameters associated with the anomaly in the computing environment.

17. The method of claim 14, wherein the second threshold number is a parameter-upscaling threshold number,
wherein modifying the first configuration of the computing resources in the computing environment comprises:
up-scaling the computing resources proportional to a magnitude of a predicted anomaly in the computing environment.

18. The method of claim 17, further comprising:
subsequent to up-scaling the computing resources in the computing environment:
detecting a predetermined period of time has elapsed;
during the predetermined period of time, analyzing a second set of consecutively-occurring batches from among the plurality of batches; and
based on determining that a number of batches identified as anomalous, from among the second set of consecutively-occurring batches, meets a parameter-downscaling threshold number: downscaling the computing resources in the computing environment.

19. The method of claim 14, wherein the second threshold number is a computing-resource-downscaling threshold number,
wherein modifying the first configuration of computing resources in the computing environment comprises: down-scaling the computing resources in the computing environment.

20. The method of claim 14, further comprising:
receiving user input selecting one action to perform based on determining that the number of batches identified as anomalous, from among the first set of consecutively-occurring batches, meets the second threshold number, the one action selected from among: (a) automatically modifying the first configuration of the computing resources in the computing environment, and (b) generating a notification indicating that the number of batches identified as anomalous, from among the first set of consecutively-occurring batches, meets the second threshold number.

21. The method of claim 14, wherein determining that the number of batches identified as anomalous, from among the first set of consecutively-occurring batches, meets the second threshold number includes labeling the first set of consecutively-occurring batches as anomalous, and
wherein modifying the first configuration of the computing resources in the computing environment is based on determining the first set of consecutively-occurring batches is labeled as anomalous.

22. The method of claim 14, wherein the computing environment is a cloud-based computing environment including a plurality of compute nodes and at least one intermediate node, the at least one intermediate node comprising a task queue for directing computing tasks to the plurality of compute nodes,
wherein the plurality of attributes of the computing environment includes a first set of attributes of the plurality of compute nodes and a second set of attributes of the at least one intermediate node,
wherein modifying the first configuration of the computing resources in the computing environment includes increasing a number of compute nodes available to the intermediate node in the computing environment for executing the computing tasks.

23. A system comprising:
one or more processors; and
memory storing instructions that, when executed by the one or more processors, cause the system to perform:
monitoring a computing environment to obtain a data set, wherein the data set comprises a plurality of data points, each data point comprising a plurality of attributes of the computing environment, wherein the computing environment is configured with a first configuration of parameters for storing and processing data in the computing environment;
applying a machine learning model to a data point among the plurality of data points to generate a prediction whether the data point corresponds to an anomaly in the computing environment;
grouping sets of consecutively-generated data points into a plurality of batches, each batch corresponding to a different segment of time;
for each particular batch of the plurality of batches:
classifying the particular batch as anomalous or non-anomalous based on a number of data points in the particular batch that are predicted to be anomalous by the machine learning model;
analyzing a first set of consecutively-occurring batches from among the plurality of batches; and
based on determining that a number of batches identified as anomalous, from among the first set of consecutively-occurring batches, meets a second threshold number: modifying the first configuration of computing resources in the computing environment to configure the computing environment with a second configuration of computing resources at least by:

up-scaling or down-scaling the computing resources based on a predicted anomaly in the computing environment, wherein up-scaling or down-scaling the computing resources based on the predicted anomaly includes at least one of: modifying a number of computing resources available to execute tasks in the computing environment, modifying a storage capacity of the computing resources, and modifying a data transmission capacity of the computing resources.

24. The system of claim 23, wherein the instructions further cause:

obtaining historical data associated with historical computing environment attributes;

generate a training data set from the historical data, the training data set comprising:

historical data points comprising historical attribute data for the plurality of attributes of the computing environment, and for each historical data point, a label indicating whether the historical data point is associated with the anomaly in the computing environment; and training the machine learning model using the training data set to generate, for a particular data point of attribute data of the computing environment, a prediction whether the particular data point corresponds to an anomaly in the computing environment.

25. The non-transitory computer readable medium of claim 13, wherein the operations further comprise:

determining the magnitude of the predicted anomaly in the computing environment based on the number of batches identified as anomalous.

* * * * *